United States Patent [19]
LeCun et al.

[11] Patent Number: 5,253,304
[45] Date of Patent: Oct. 12, 1993

[54] METHOD AND APPARATUS FOR IMAGE SEGMENTATION

[75] Inventors: Yann A. LeCun, Lincroft, N.J.; Ofer Matan, Escondido Village, Calif.; William D. Satterfield, Keyport; Timothy J. Thompson, Howell, both of N.J.

[73] Assignee: AT&T Bell Laboratories, Murray Hill, N.J.

[21] Appl. No.: 800,653

[22] Filed: Nov. 27, 1991

[51] Int. Cl.$^5$ .......................... G06K 9/34; G06K 9/46
[52] U.S. Cl. ............................................. 382/9; 382/18
[58] Field of Search ................. 382/9, 18, 48, 1, 51; 209/584; 358/466

[56] References Cited

U.S. PATENT DOCUMENTS

| | | | |
|---|---|---|---|
| 4,562,594 | 12/1985 | Bednar et al. | 382/9 |
| 4,635,290 | 1/1987 | Tsuji et al. | 382/9 |
| 4,731,857 | 3/1988 | Tappert | 382/9 |
| 5,033,098 | 7/1991 | Tanaka et al. | 382/9 |
| 5,050,224 | 9/1991 | Mori | 382/9 |

FOREIGN PATENT DOCUMENTS 3-225489 10/1991 Japan ........................................ 382/9

Primary Examiner—Michael T. Razavi
Assistant Examiner—David Fox
Attorney, Agent, or Firm—Robert B. Levy

[57] ABSTRACT

Segmentation of characters in a character set (10), made by placing a dark mark against a light background (12), is accomplished by establishing a vertical pixel projection for each pixel column in the image. The vertical pixel projections are filtered with a decay parameter so those pixel columns which contain only background have the highest projection. Thereafter, a set of "cut-points" (points of image segmentation) is obtained so that each cut-point coincides with a pixel column whose vertical pixel projection is both a local maxima and exceeds a predetermined threshold. The number of such cut-points is counted and if the number is not significantly greater than a predetermined number, the image is segmented along the cut-points. Otherwise, the vertical projections of those pixel columns coincident with the cut-points are filtered with a decreasing threshold to reduce the number of potential cut-points.

12 Claims, 3 Drawing Sheets

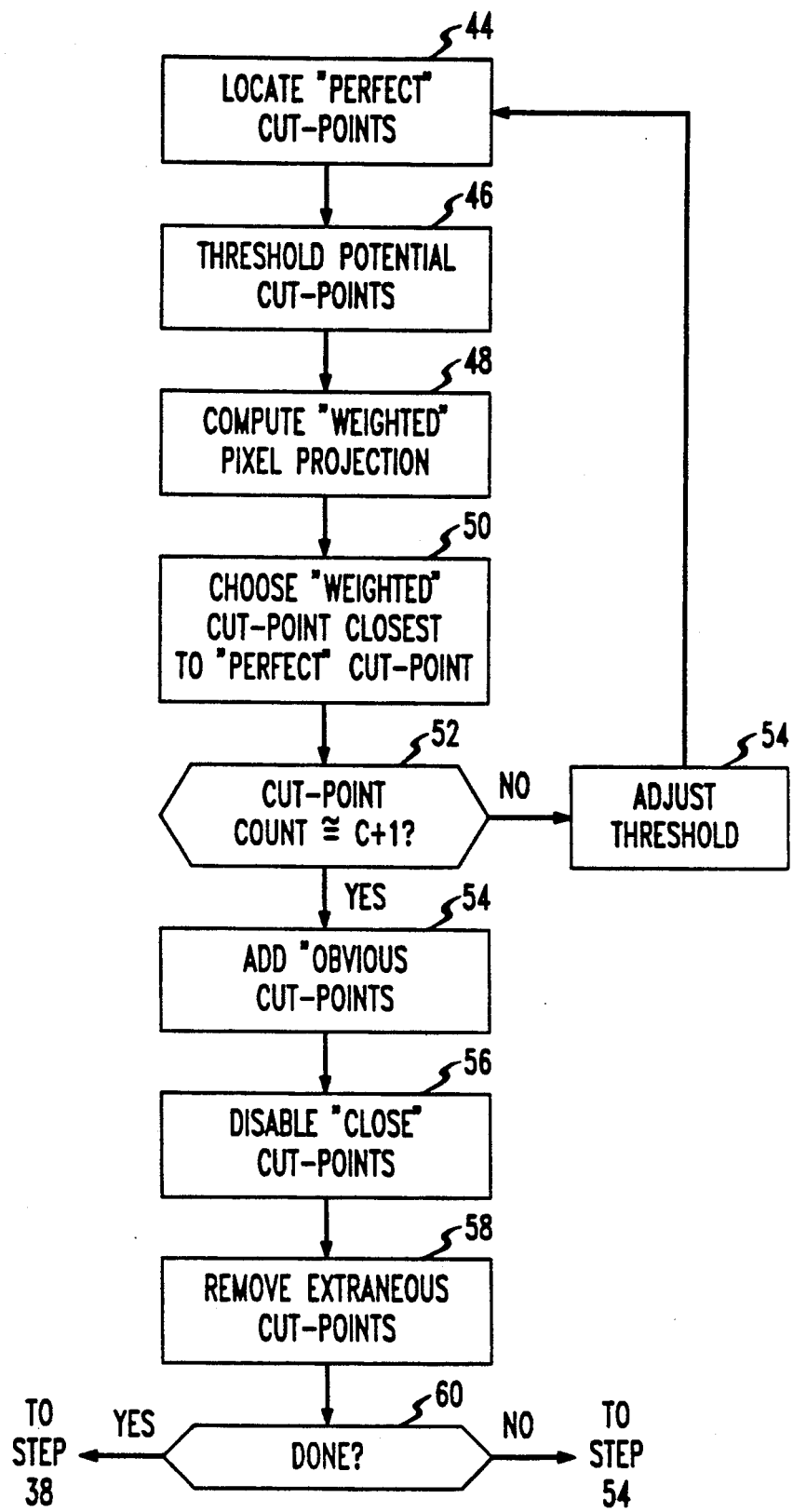

METHOD AND APPARATUS FOR IMAGE SEGMENTATION

GOVERNMENTAL INTEREST

This invention was funded under a governmental contract awarded by the United States Postal Service, No. 104230-90-C-2456.

TECHNICAL FIELD

This invention relates to a technique for segmenting an image into smaller portions to facilitate the analysis thereof.

BACKGROUND OF THE INVENTION

Automatic recognition of handwritten information is desirable in many applications. The recognition of handwritten postal zip codes is but one example. Although only some 15% of all first class United States Mail is addressed by hand, even this small percentage translates into some 10 billion pieces of mail on an annual basis. Since current day optical character recognition equipment cannot usually read handwritten zip codes with any high degree of accuracy, mail containing such zip codes must usually be manually sorted, a tedious and labor intensive process.

One of the problems which has plagued the development of systems for accurately analyzing handwritten characters, such as a handwritten zip code, is that individuals often write differently. For example, some may chose to "write" a zip code by printing individual numbers while others may chose to write in cursive, so that two or more characters are connected to each other. Individually printed numbers are usually easy to recognize while recognizing cursive-written numbers which are connected to each other is quite difficult. Most recognition systems are trained to read separate individual numbers. A connected pair of numbers (or other alphanumeric characters) thus often appears unrecognizable. However, were it possible to segment the image containing the connected pair of numbers, that is, to partition the image, so that each character lies within a separate field, then recognition could be more easily accomplished.

One possible technique for segmenting an image containing a set of characters, such as a handwritten zip code, into separate fields is to iteratively segment the image and then evaluate (score) the degree to which the partitioned characters can be accurately recognized. Initially, the image is partitioned into fields of equal width, with the number of fields corresponding to the number of characters. Thereafter, the character in each field would be analyzed for recognition purposes, and a score would then be established based on the number of characters in the image which were correctly recognized. The partitioning of the image would then be adjusted and the image re-analyzed. The partitioning which yields the highest score would be selected as the best one. While this technique for image segmentation is useful, it is often time consuming.

Thus, there is a need for a technique for efficiently segmenting an image to facilitate recognition of the characters therein.

SUMMARY OF THE INVENTION

Briefly, in accordance with a preferred embodiment of the invention, a technique is disclosed for segmenting a character-containing image to partition each character into a separate field to facilitate analysis and recognition thereof. The technique is carried out by first establishing a vertical pixel projection for each separate vertical column of pixels in the image in accordance with the sum of the intensity of the pixels in that column. In practice, the character-containing image can be represented as a plurality of individual picture elements (pixels), each pixel having a particular intensity throughout. The characters in the image are typically established by making an ink or pencil mark against a white or light-colored background so that those pixels which contain part of a character have a lower intensity than those which contain only background. Thus, the larger the portion of a character contained in a given pixel column, the greater the difference between the vertical pixel projection for that column and one which encompasses substantially background.

Each vertical pixel intensity projection if filtered such that the vertical pixel projections associated with the pixel columns containing only background have local maxima. The location of each pixel column whose filtered vertical pixel projection is both a local maximum and exceeds a predetermined threshold value is established as a "cut-point," i.e., a point at which the image should be segmented. The number of cut-points is then counted. If the counted number of cut-points is not substantially greater than a predetermined number (typically equal to one more than the number of characters in the image), then the right number of cut-points has been established, and the image is segmented at the cut-points. In this way, the image is segmented at its ends and generally between each of the characters. (Too few cut-points implies that proper segmentation of the image is not possible.)

If, however, the number of cut-points is substantially greater than the predetermined number (implying that too many segmentation points have been identified, leading to possible bisection of a character), then segmentation of the image at the previously identified cut-points is not carried out. Instead, the previously established potential cut-points are filtered with a gradually decreasing threshold and the step of counting the number of cut-points is then repeated. The steps of filtering the cut-points with a decreasing threshold and counting the number of cut-points are repeated until the desired number of cut-points is obtained whereupon the image is segmented at the cut-points.

BRIEF DESCRIPTION OF THE DRAWING

FIG. 5 is a flowchart diagram of the sub-steps executed to perform a step in the process of FIG. 4.

DETAILED DESCRIPTION

Figure 1:
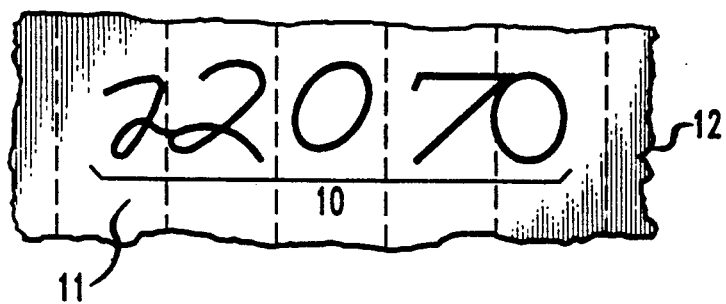
FIG. 1 depicts an image of a handwritten set of characters which is to be segmented in accordance with the invention.

Referring to FIG. 1, the present invention is directed to a technique for segmenting an image containing a set of characters 10 such that each character is partitioned into a separate and distinct field 11 to facilitate analysis and recognition thereof. In the illustrated embodiment, the character set 10 depicted in FIG. 1 is comprised of five digits, representing a five-digit postal zip code "22070." Each character (digit) of the character set 10 in FIG. 1 is typically made by placing a dark mark (with ink or pencil for example) against a white or light-colored background, the background typically being the surface of an envelope 12. It should be understood that the character set 10 in FIG. 1 may contain a larger or smaller number of digits or even alphanumeric characters.

Some of the characters in the character set 10 of FIG. 1 are depicted as being connected to each other, which makes recognition of such characters a difficult task. Most character recognition systems are trained to recognize single characters, not connected characters. Thus, in FIG. 1, the only single character that would be readily recognizable would be the unconnected "0." The connected pair of "2s" and the connected "7" and "0" would typically be rejected from the standpoint that the recognition score of such connected characters (the degree of confidence in the accuracy of their recognition) would too low to be useful.

Figure 2:
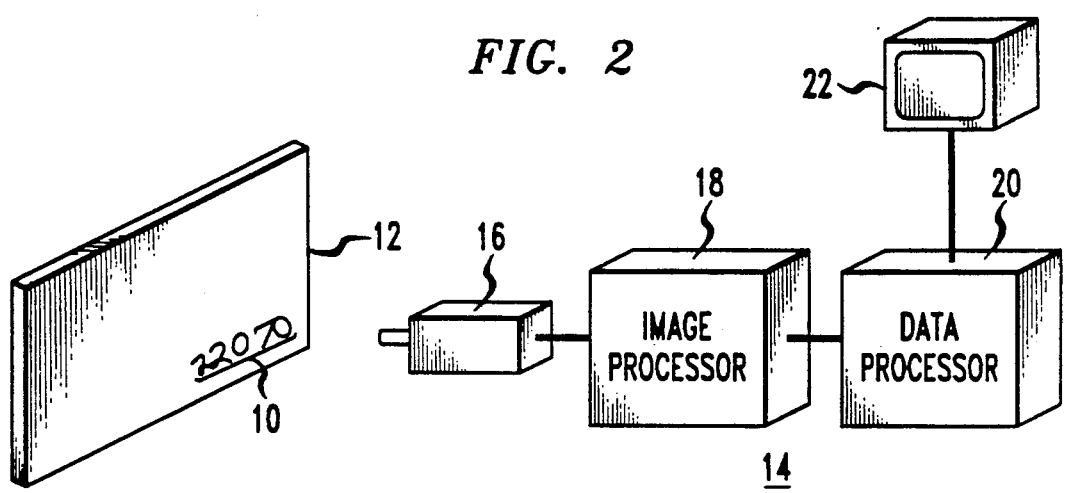
FIG. 2 is a block schematic diagram of an apparatus, in accordance with the invention, for efficiently segmenting each of the images of FIG. 1.

Referring to FIG. 2, there is shown a system 14, in accordance with the teachings of the invention, for segmenting the connected characters in the character set 10 of FIG. 1 to facilitate analysis and recognition thereof. As will be appreciated, the system 14 is effective to segment not only the entire image of the character set 10, but portions of the set as well, such as one or more portions containing a pair of connected characters. The system 14 includes an image acquisition device 16, in the form of a television camera or scanner, which serves to capture the image of the character set 10 and to deliver a video signal, varying in accordance with the captured image, to an image processor 18, typically a machine vision system, as is well known in the art. The image processor 18 serves to digitize the captured image, i.e., to transform the analog signal from the camera 16 into a plurality of digital words, each representing the intensity of a small portion (a picture element or "pixel") of the captured image.

Figure 3:
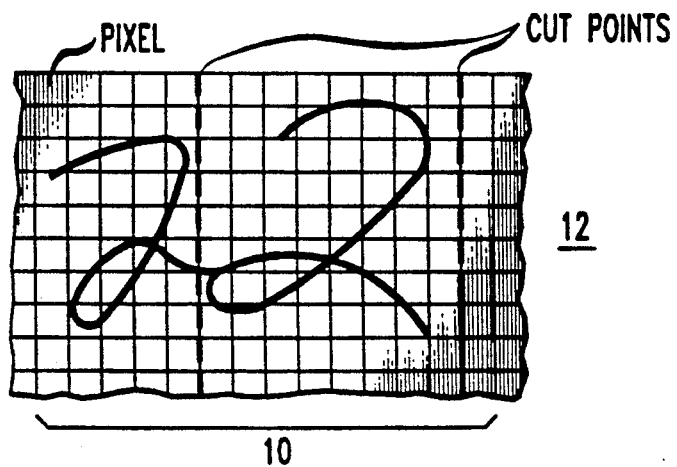
FIG. 3 depicts a portion of the image of FIG. 1, showing individual picture elements (pixels) within the image.

FIG. 3 shows a portion of the image of the character set 10 with the individual pixels which now collectively represent the image. Since each character of the character set 10 is typically formed by making a pen or pencil marking against the background 12 which is typically white or light-colored, each pixel that contains a portion of a character will have a lower pixel intensity than a pixel which contains part of the background.

Referring to FIG. 2, the output of the image processor 18 is supplied to a data processing system 20, which, as will be described, serves to segment the image containing the character set 10 of FIG. 2. A monitor 22 is coupled to the data processing system 20 to display the output thereof.

Figure 4:
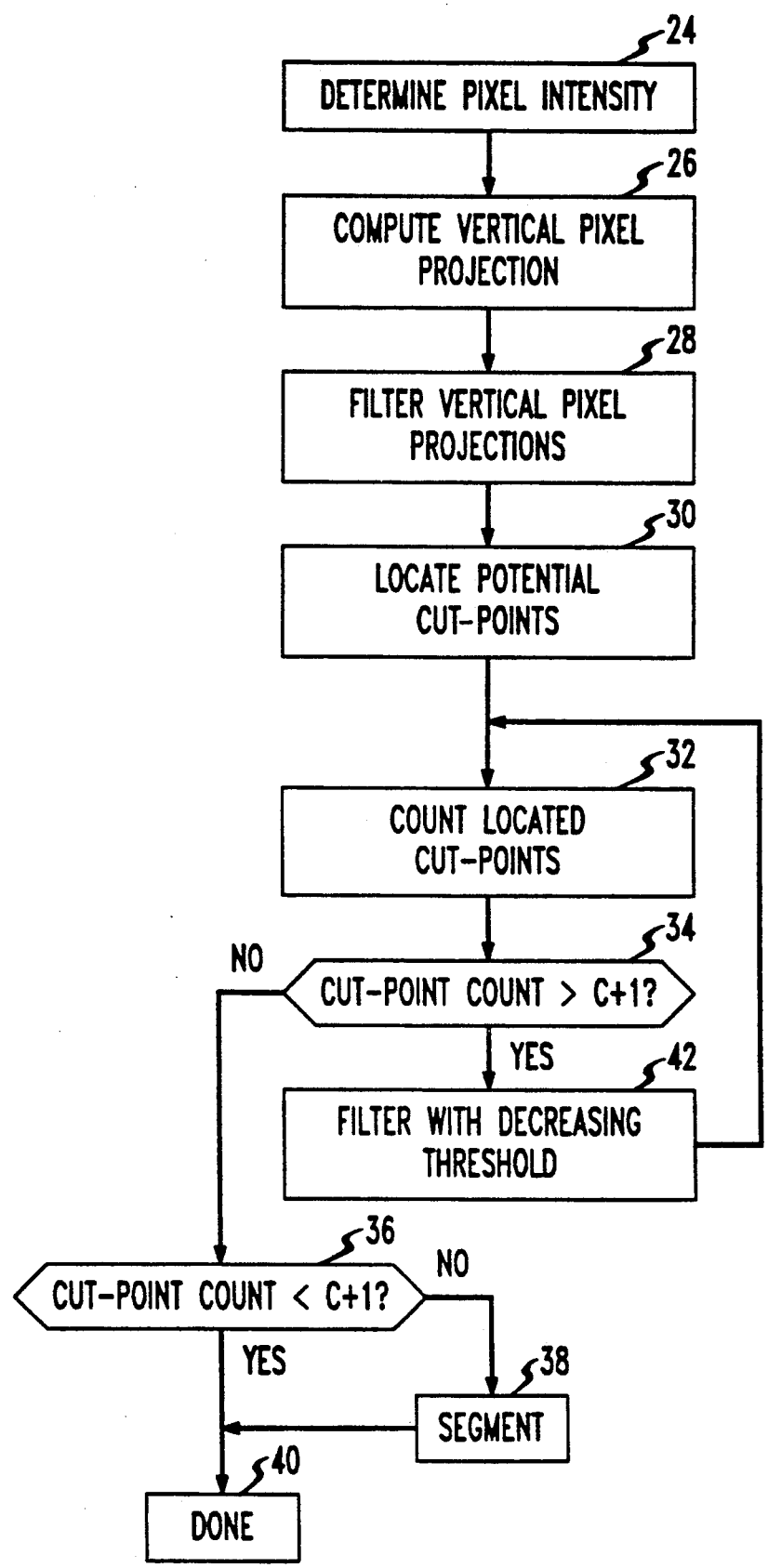
FIG. 4 is a flowchart diagram of a process in accordance with the invention, for segmenting the character-containing image of FIG. 1.

FIG. 4 is a flowchart diagram illustrating generally the steps performed by the system 14 of FIG. 2 to segment the image containing the character set 10 of FIG. 1 (or a portion thereof) in accordance with the invention. For example, under some conditions, it may be preferable to attempt to initially recognize all of the characters. Those characters that are recognizable with a high degree of accuracy can be eliminated. Thus, for purposes of further discussion, when referring to the character set 10, it should be understood that it may not necessarily contain both individually recognizable characters and connected characters, but it will always contain some connected characters.

The first step (step 24) in the process is to determine the intensity of each of the pixels comprising the captured image of the character set 10 of FIG. 1. As indicated, the intensity of each pixel is established by the image processor 18 of FIG. 2. Once the pixel intensities are established, then for each vertical column of pixels, a vertical pixel projection for that column is computed by the data processor 20 of FIG. 2 by summing the intensity of the pixels in that column (step 26). Referring now to FIG. 3, since the characters of the character set 10 are darker than the background 12, the larger the number of pixels in a given vertical column which contain part of a character, the lower the value of the vertical pixel projection of that column. Conversely, the larger the number of pixels which contain the background 12, the greater the value of the vertical pixel projection.

Referring to FIG. 4, after the vertical pixel projection of each pixel column is computed, the projections are filtered (step 28) by the data processor 20 of FIG. 2, typically in a two-step process. First, the vertical pixel projections are filtered with a decay parameter set in accordance with the ratio of character height/estimated character width. The vertical pixel projections, when filtered using such a decay parameter, will exhibit a value of approximately "one" for those pixel columns which contain mostly the background 12 of FIG. 3 and a value of zero for those columns, the majority of whose pixels contain part of a character of the character set 10 of FIG. 3.

The filtering process performed during step 28 is completed by passing the previously-filtered vertical pixel projections through a convolution filter (not shown) established by the data processor 20 of FIG. 2. In practice, the convolution filter takes the form of a five-point filter containing the values [1,2,4, 2,1]. It should be understood that other values could be used, as well as other types of convolution filters.

Following the filtering step 28, step 30 is executed, whereupon the location(s) of potential "cut-points" (i.e., pixel columns along which the image may be potentially segmented) is established. The potential cut-points are located by finding those pixel columns in the image of FIG. 3 whose filtered vertical pixel projection is both a local maxima and also exceeds a predetermined threshold. As may now be appreciated, after being filtered during step 28, the vertical pixel projection of those pixel columns which contain almost all background will be much greater than the vertical pixel projection for those columns containing a large part of the character set 10 of FIGS. 1 and 3. Therefore, each pixel column whose filtered vertical pixel projection exhibits a "local maximum" (i.e., a large vertical projection value as compared to that of neighboring pixel columns) represents a good location at which the image can be segmented without bisecting a character of the character set 10.

However, rather than simply establishing a potential cut-point to coincide with every pixel column whose filtered vertical pixel projection exhibits a local maximum, it is useful to threshold the vertical pixel projections of those columns representing such local maxima. In other words, only those vertical pixel columns whose filtered vertical pixel projection is both a local maximum and also exceeds a predetermined threshold are considered. The reason for applying a threshold is to eliminate the likelihood of establishing too many cut-points. Establishing too many cut-points could result in too much segmentation of the image so that not enough of any of the characters in the character set 10 lies between a pair of the cut-points for recognition purposes.

Having located those potential cut-points which coincide with the pixel columns whose vertical pixel projections are both local maxima and exceed the predetermined threshold, the next step is to count the number of such cut-points (step 32). After step 32, step 34 is executed, whereupon a check determines whether the number of cut-points previously counted is substantially greater than a prescribed number which is typically set equal to one more than c, the number of characters in the character set. In practice, it is desirable to segment the image of the character set 10 at the ends of the set and between the characters therein. To segment the image of the character set 10 in this fashion requires that there be at least one more cut-point than the number of characters in the set. If the number of cut-points substantially exceeds $c+1$, then there are probably too many such cut-points, increasing the likelihood that a character in the character set 10 could be bisected during image segmentation, decreasing the ability to correctly recognize the character. (On the other hand, too few cut-points implies that no valid segmentation is possible).

If, during step 34, a determination is made that the cut-point count is not substantially greater than $c+1$, then step 36 is executed to determine whether the cut-point count is less than $c+1$. Should a determination be made during step 36 that the cut-point count equals or slightly exceeds $c+1$ (the desired number of cut-points), then the image of the character set 10 is segmented at each of the cut-points (step 38). More than $c+1$ cut-points are permissible since the recognition process can determine the most likely correct cut-point. Thereafter, the process is completed (step 40) and recognition of the characters in the set is then accomplished, either by the data processor 20, or another system, using well-known techniques. However, if the cut-point count is found to be less than $c+1$, then as indicated, segmentation of the image is not possible, and step 40 is executed immediately after step 36, indicating that the segmentation process is now done.

Depending on the nature of the characters in the set 10, it is quite possible that the number of the potential cut-points located during step 30 will substantially exceed $c+1$. If, during step 34, the number of cut-points substantially exceeds $c+1$, then step 42 is executed and the cut-points previously located during step 32 are filtered with a decreasing threshold in an effort to obtain the desired number of cut-points. The manner in which the "excess" number of cut-points is filtered is best illustrated in FIG. 5.

Referring to FIG. 5, the first step in this filtering process is to locate a set of "perfect" cut-points, that is, to locate a set of $c+1$ cut-points which are evenly distributed (spaced) throughout the image of the character set 10 (step 44) Next, the set of potential cut-points, previously established during step 32, is thresholded such that those potential cut-points which coincide with pixel columns whose pixel projection is less than a threshold value, or which columns are spaced more than a predetermined distance from a perfect cut-point, are eliminated (step 46). Thereafter, the vertical pixel projections of those pixel columns coinciding with the remaining cut-points are weighted (step 48). The weighting is accomplished by first computing a Gaussian distribution about each perfect cut-point previously established during step 44. Once the Gaussian distributions are established, then the potential cut-points remaining after thresholding during step 46 are weighted by multiplying the vertical pixel projection of each pixel column coinciding with a remaining cut-point by the Gaussian distribution value of the perfect cut-point at the location of that column. The purpose in weighting the vertical pixel projections associated with the remaining potential cut-points in this fashion is to improve their "rating" so that those potential cut-points closest to a perfect cut-point have their ratings increased.

Following step 48, step 50 is executed whereupon those of the weighted potential cut-points closest to the perfect cut point are selected, the selection being based on cut-points having the highest vertical pixel projections. Thereafter, step 52 is executed and a check is then made whether the selected number of cut-points is approximately equal to the desired number of cut-points. If not, then the threshold value is adjusted during step 53, and step 44, and those following it are re-executed. Note that a few extra cut-points may not necessarily be undesirable at this juncture.

Once a determination has been made during step 52 that a desired number of cut-points has been obtained, it is useful to add to that list those cut-points which are "obvious", according to some threshold (step 54). Obvious cut-points are those which coincide with pixel columns having a high pixel projection but may have otherwise been eliminated because of their distance from one of the perfect cut-points. Following step 54, "close" cut-points are disabled, that is, if two cut-points are spaced very close to each other, one is eliminated (step 56). In eliminating those cut-points which are close, care is given to avoid eliminating those which are "very obvious," i.e., which coincide with a pixel column having a very high vertical pixel projection.

After the close cut-points are eliminated, then those extraneous cut-points, that is, the cut-points which enclose extraneous material (e.g., a dash or a very small amount of dark mark not intended to be a character) are eliminated (step 58). In deciding whether a pair of cut-points enclose extraneous material, the aspect ratio of the mark between these two cut-points, as well as the vertical location of the mark are considered. Once the extraneous cut-points have been eliminated, then a check is made whether the filtering process is completed (i.e., whether the cut-point count approximately equals the desired cut-point count (step 60)). If so, step 38 of FIG. 4 is executed and the image is segmented along the cut-points that have now been established. Otherwise, step 53 of FIG. 5 is executed and the threshold is adjusted prior to proceeding back to step 44.

The foregoing describes a method and apparatus for segmenting a character-containing image by establishing cut-points (points at which the image is to be segmented) in accordance with the vertical pixel projections of the pixel columns, to facilitate analysis and recognition of the characters in the image.

It is to be understood that the above-described embodiments are merely illustrative of the principles of the invention. Various modifications and changes may be made thereto by those skilled in the art which will embody the principles of the invention and fall within the spirit and scope thereof. For example, while the present invention has been described as containing separate elements (the image processor 18 and data processor 20) for carrying out the method of the invention, those skilled in the art will appreciate that a single data processing element, could be employed as well as multiple distributed elements without departing from the scope of the invention.

We claim:

1. A method of segmenting a character-containing image formed of a plurality of individual picture elements (pixels) to partition each character into a separate field, comprises the steps of:

(a) establishing a vertical pixel projection for each column of pixels in the image in accordance with the sum of the intensities of the pixels in said column;

(b) filtering the vertical pixel projections such that the smaller the amount of character contained in each pixel column, the greater that column's vertical pixel projection;

(c) locating a plurality of potential cut-points in the image (points of image segmentation), each potential cut-point coinciding with a respective one of the pixel columns whose filtered vertical pixel projection has a local maxima and exceeds a predetermined threshold;

(d) counting the number of potential cut-points;

(e) segmenting the image at each potential cut-point if the number of potential cut-points approximates a prescribed number; otherwise (f) filtering the vertical pixel projection of each pixel column coinciding with a respective one of the potential cut-points with a decreasing threshold to reduce the number of potential cut-points; and (g) repeating steps (d) and (f) until the number of potential cut-points approximates said prescribed number.

2. The method according to claim 1 wherein the step (f) of filtering the vertical pixel projections with a decreasing threshold comprises the steps of:

(a) establishing a set of "perfect" cut-points which are evenly distributed throughout the image;

(b) discarding each potential cut-point which is coincident with a pixel column whose vertical pixel projection is less than a predetermined threshold and whose location is greater than a predetermined distance from a respective one of the perfect cut-points;

(c) weighting the vertical pixel projections associated with the potential cut-points remaining after said discarding step, (d) choosing those potential cut-points which are closest to the perfect cut-points and which are coincident with those pixel columns having the highest weights;

(e) counting the number of chosen potential cut-points;

(f) adjusting the predetermined threshold if the counted number of cut-points is less than a preselected number and repeating steps (b)-(e); otherwise (g) creating additional potential cut-points to coincide with those pixel columns whose weighted vertical pixel projection exceeds a prescribed value;

(h) eliminating potential cut-points which are spaced within a predetermined distance from another potential cut-point;

(i) eliminating cut-points which cause inclusion of extraneous information; and (j) counting the number of potential cut-points that remain and reexecuting step (f) if the number is less than the preselected number.

3. The method according to claim 1 wherein the step of filtering the vertical pixel projections such that the smaller the amount of character contained in the pixel column, the greater the column's vertical pixel projection, comprises the steps of:

filtering each vertical pixel projection with a decay parameter; and subsequently filtering the previously-filtered pixel projections with a convolution filter.

4. The method according to claim 2 wherein the step of weighting the vertical pixel projections comprises the steps of:

computing a Gaussian profile about each perfect cut-point; and multiplying each vertical pixel projection by the value of the closest perfect cut-point's Gaussian distribution at the location of the column associated with said vertical pixel projection.

5. The method according to claim 3 wherein the decay parameter is established in accordance with the ratio of the projection height of the characters to their width.

6. The method according to claim 3 wherein the convolution filter smooths the vertical pixel projections using the smoothing values [1,2,4,2,1].

7. Apparatus for segmenting a character-containing image formed of a plurality of individual picture elements to partition each character into a separate field, comprising:

(a) first means for establishing a vertical pixel projection for each column of pixels in the image in accordance with the sum of the intensities of the pixels in said column;

(c) second means, responsive to said first means, for filtering the vertical pixel projections such that the smaller the amount of character contained in each pixel column, the greater that column's vertical pixel projection;

(d) third means, responsive to said second means, for locating a plurality of potential cut-points in the image (points of image segmentation), each potential cut-point coinciding with a respective one of the pixel columns whose filtered vertical pixel projection has a local maxima and exceeds a predetermined threshold;

(e) fourth means, responsive to said third means, for counting the number of potential cut-points;

(f) fifth means, responsive to said fourth means, for segmenting the image at each potential cut-point if the number of potential cut-points approximates a prescribed number; and (g) sixth means, responsive to said fourth means, for filtering the vertical pixel projection of each pixel column coinciding with a respective one of the potential cut-points with a decreasing threshold to reduce the number of potential cut-points when the number of cut-points is much greater than the prescribed number.

8. The apparatus according to claim 7 wherein the sixth means for filtering the vertical pixel project with a decreasing threshold comprises:

(a) seventh means for establishing a set of "perfect" cut-points which are evenly distributed throughout the image;

(b) eighth means, responsive to said seventh means, for discarding each potential cut-point which is coincident with a pixel column whose vertical pixel projection is less than a predetermined threshold and whose location is greater than predetermined distance from a respective one of the perfect cut-points;

(c) ninth means, responsive to said eighth means, for weighting the vertical pixel projections associated with the potential cut-points remaining after discarding;

(d) tenth means, responsive to said ninth means, for choosing those potential cut-points which are closest to the perfect cut-points and which are coincident with those pixel columns having the highest weights;

(e) eleventh means, responsive to said tenth means, for counting the number of chosen potential cut-points;

(f) twelfth means, responsive to said eleventh means, for adjusting the predetermined threshold if the counted number of cut-points is less than a preselected number;

(g) thirteenth means, operative when said eleventh means has a predetermined number of cut-points greater than said preselected number, for creating additional potential cut-points, each coinciding with a pixel column whose weighted vertical pixel projection exceeds a prescribed value;

(h) fourteenth means, responsive to said thirteenth means, for eliminating each potential cut-point which is spaced within a predetermined distance from another potential cut-point;

(i) fifteenth means responsive to said thirteenth means for eliminating cut-points which cause inclusion of extraneous information;

(j) sixteenth means, responsive to said fourteenth and fifteenth means, for counting the number of potential cut-points and for causing said eleventh means to be operational if the counted number of potential cut-points is less than the preselected number.

9. The apparatus according to claim 7 wherein said second means for filtering the vertical pixel projections comprises:

a first filter for filtering each vertical pixel projection with a decay parameter; and a second convolution filter for subsequently filtering the vertical pixel projections filtered by the first filter.

10. The apparatus according to claim 8 wherein said eighth means for weighting the vertical pixel projections comprises:

seventeenth means for computing a Gaussian profile about each perfect cut-point; and eighteenth means, responsive to said seventeenth means, for multiplying each pixel projection by the value of the closest perfect cut-point's Gaussian distribution at the location of the pixel column corresponding to said vertical pixel projection.

11. The apparatus according to claim 9 wherein the decay parameter is established in accordance with the ratio of the projection height of the characters to their width.

12. The method according to claim 3 wherein the convolution filter is a five-point filter utilizing the smoothing values of [1,2,4,2,1].

* * * * *